Feb. 23, 1960 H. G. TWIFORD 2,925,857
TIRE BEAD HOLDING TOOL

Filed Nov. 15, 1956 3 Sheets-Sheet 1

INVENTOR.
Harry G. Twiford
BY
ATTORNEYS

Feb. 23, 1960 H. G. TWIFORD 2,925,857
TIRE BEAD HOLDING TOOL
Filed Nov. 15, 1956 3 Sheets-Sheet 2

INVENTOR.
Harry G. Twiford
BY
McGrew & Edwards
ATTORNEYS

Feb. 23, 1960 H. G. TWIFORD 2,925,857
TIRE BEAD HOLDING TOOL
Filed Nov. 15, 1956 3 Sheets-Sheet 3

INVENTOR.
Harry G. Twiford
BY
*Matthew & Edwards*
ATTORNEYS

United States Patent Office 2,925,857
Patented Feb. 23, 1960

2,925,857
TIRE BEAD HOLDING TOOL

Harry G. Twiford, Denver, Colo.

Application November 15, 1956, Serial No. 622,303

3 Claims. (Cl. 157—1)

This invention relates to tire-mounting tools and a method of mounting a tire on a wheel, and more particularly to tools for and a method of mounting pneumatic tires on drop-center wheels in such a manner that the bead of the pneumatic tire does not touch the rim of the wheel as it is being placed on the wheel.

Tubeless tires have recently become standard equipment on new automobiles and have largely replaced tires requiring an inner tube to hold the air. Since there is no tube used with such tubeless tires, the contact between the tire bead and the wheel rim is critical since this connection may be a major source of leak of air from the tire. The mounting and dismounting of tubeless tires from wheels must be done with extreme caution since any nick or crease on the tire bead will disrupt the seal and will cause a leak between the two members. With the very recent trend of the use of smaller wheels, the mounting and dismounting of tires from such small wheels becomes extremely difficult and many tires are ruined with the tools now available. It is readily seen that in reducing the diameter of the opening of the tire one inch, the circumferential extent is reduced by over three inches. The reduction in size makes the mounting and dismounting of the smaller tires on the smaller wheels extremely difficult, since it has actually reduced the total amount of stretch which is necessary to permit the tire bead to pass over the rim of a wheel. Also, the majority of the smaller wheels have a very sharp rim, and in mounting a tire, the rim frequently cuts and nicks the bead.

According to the present invention, I have discovered a tire-mounting structure which includes a bead-holding member and a bead-dropping member which are arranged to operate on a wheel rim for dropping a tire bead over the rim into the drop center of the wheel without having the tire bead touch the wheel rim during the mounting operation. The tire-mounting tool provides smooth surfaces over which the bead of the tire may pass without contacting the tire bead with the sharp edges of the rim or subjecting the bead impact tools commonly used in placing a bead over the rim of a wheel. The tire-mounting structure quickly and effectively drops the bead over the rim of the wheel with a simple rotary movement of a bead-dropping mechanism around the rim of a wheel.

Included among the objects and advantages of the present invention is a tire-mounting structure which is arranged to simply and effectively drop a bead over the rim of a wheel without permitting the tire bead to touch the rim of the tire during the mounting operation. The invention includes a method of mounting a tire on a wheel so that the tire bead does not contact the rim during the operation. The device provides an effective mechanism for mounting a tire on a wheel without impact tools and without cutting or nicking the beads of the tire. The tire-mounting structure provides a plurality of smooth surfaces over which a tire bead may be dropped across the rim of a wheel into mounted position on a wheel. The tire-mounting structure, also, provides a pick-up mechanism which picks up the bead of a tire being mounted, places it in position to drop over the rim of a wheel and effectively preventing the tire bead from coming into contact with the wheel rim during the mounting operation.

These and other objects and advantages of the present invention may be readily ascertained by referring to the following description and the appended illustrations in which.

In a common tire-mounting process, a wheel is placed in substantially horizontal position, and a tire to be mounted thereon is placed on top of the wheel. One side of the lower bead of the tire is placed over the upper rim of the wheel, and then by various mechanisms the bead of the tire is progressively forced over the remaining part of the rim so that the tire bead is under the rim of the wheel. The construction of the wheel and the tire is such that the rim of the wheel is substantially larger than the diameter of the opening of the bead of the tire, so that when the tire is mounted on the wheel the bead of the tire may rest laterally or axially against the rim of the wheel and be held thereon. The process is repeated with the upper bead, passing it over one section of the rim of the wheel and then progressively forcing the remainder of the bead of the tire over the rim into the drop center of the wheel.

Figure 2:
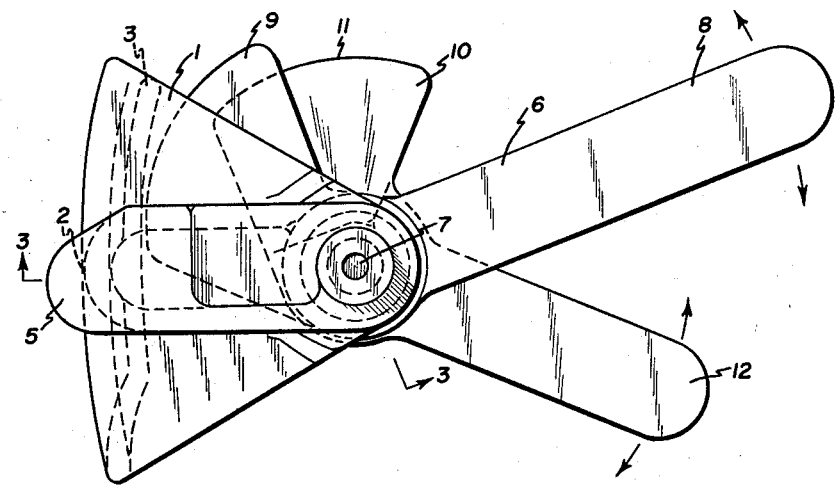
Fig. 2 is a top plan view of a bead-holding mechanism of the structure.
Figure 3:
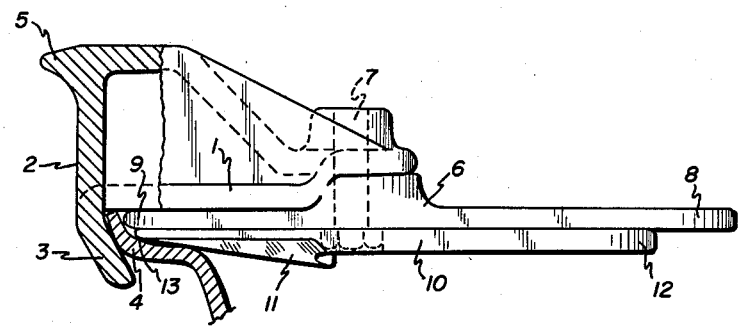
Fig. 3 is a partial cross-sectional view of the bead-holding mechanism taken along section line 3—3 of Fig. 2.
Figure 4:
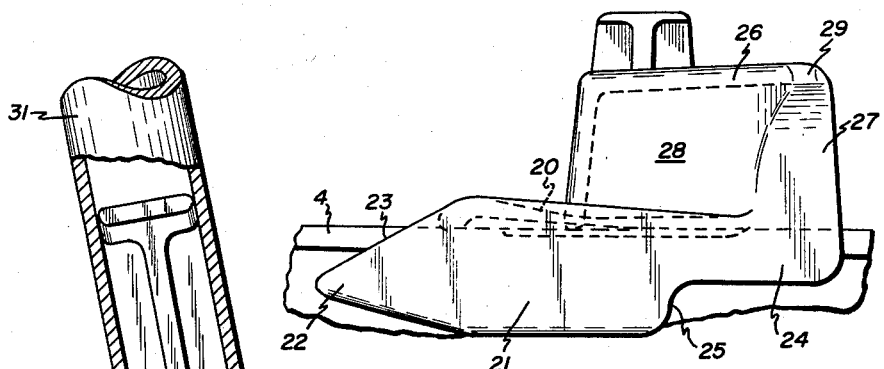
Fig. 4 is a side-elevational view of a bead-dropping mechanism.

The device illustrated in Fig. 2 is a bead-holding mechanism which is arranged to be attached to the rim of a wheel and hold a segment of a bead of a tire stationary and in the drop center while the remaining part of the bead is progressively passed over the rim of the wheel. The holding mechanism includes a body portion 1 which is arranged to lie on a rim and radially of a wheel on which it is mounted. An integral axial or lateral surface 2 extends upwardly from the body. A lower inwardly biased surface 3 which is arranged to hook over the rim 4 of a wheel is connected to the body. An upper bead stop 5 is provided which prevents the axial movement of the bead away from the rim of the wheel during the mounting process. The body is securely attached to the rim 4 by means of a rim-gripping cam 6 pivotally mounted on the body by means of a pivot mount 7. The rim-gripping device includes a handle portion 8 and a connected cam surface 9 which moves into and out of contact with a rim by movement of the handle portion 8. With the portion 3 hooked over the rim 4, the handle 8 is moved in counterclockwise direction so that the cam surface 9 engages the rim and securely locks the body 1 thereon. Since the flanges on the rims of the wheel are not uniform, a leveling cam is provided which includes an axially-directed cam surface 11 and a handle 12 pivoted on the pivot 7. With the surface 3 hooked over the rim 4 and the locking cam 9 in place against a rim, the leveling cam 10 is also moved counterclockwise so that the surface 11 securely locks the cam 9 with the horizontal surface 13 of the rim. When a tire is being placed on a wheel, a very great force is exerted on the bead stop due to pull of stretching the tire bead in attempting to place it on the rim, and the leveling device prevents the bead stop from tilting and being pulled off the rim.

Figure 5:
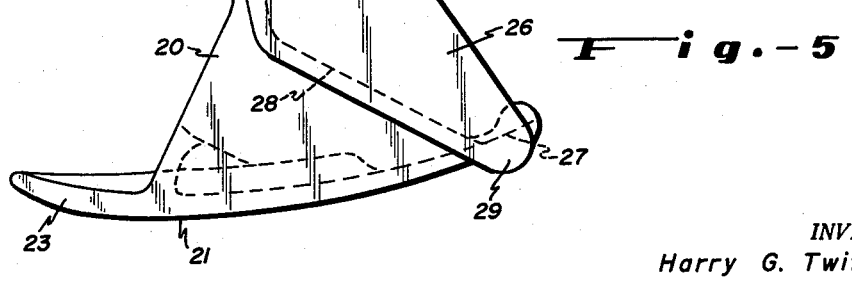
Fig. 5 is a top plan view of a bead-dropping mechanism.

The bead-dropping assembly of the tire-mounting structure is illustrated in Fig. 5. The dropping structure includes an arcuate body 20 which is arranged to seat substantially horizontal on a horizontally-held wheel, and a rim-hooking portion or flange 21 extending laterally from the body and arcuately curved to correspond generally to the arc of the rim of a wheel. The portion 21 ends in a pointed member 22 at one end, which is arranged to ride generally below the edge of the rim 4, and the upper, diagonal, connecting surface 23 between the point 22 and the surface 21 extends upwardly into the body 20. The width of the surface 21 is reduced at the rear portion 24 thereof, and a shoulder 25 interconnects the two portions. An axially-extending portion 26 extends upwardly from the body 20 and it includes a front upright surface 27 and a diagonal bead-guiding surface 28 which extends from the upright surface 27 above the portion 24 rearwardly of the device. A radially-extending stop 29 is mounted above the upright surface 27 and is arranged to prevent axial movement of the tire bead away from the wheel rim. A handle mount 30 extending rearwardly of body 20 provides means for mounting a handle 31 thereon.

Figure 1:
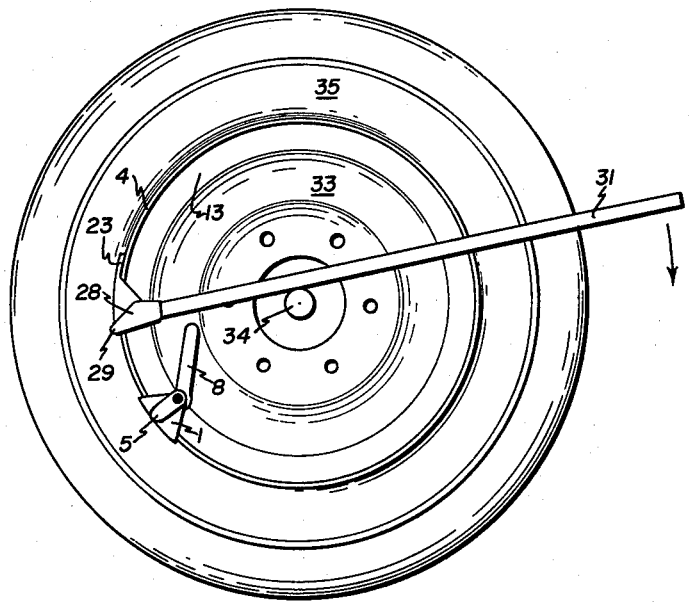
Fig. 1 is a top plan view of a tire-mounting mechanism in operative position on a pneumatic tire wheel in position to mount a tire on a wheel.

In operation of the tire mounting assembly, illustrated in Fig. 1, a wheel, shown generally by numeral 33, is mounted in substantial horizontal position over an upright center post 34, such as is commonly used on many tire-changing machines. The bead stop is locked on the rim 4 of the wheel and a tire, shown in general by numeral 35, is placed on the wheel with the lower bead hooked over the upright section 2 of the stop. The bead drop device is then placed on the rim 4, with the portion 21 hooked over the rim, at a point on the rim closely spaced to the stop. The lower bead of the tire is placed on the body 20 adjacent the upright surface 28, along the upright 27 and under the bead stop 29. The handle 31 is then moved in a clockwise rotation so that the surface 28 moves along the lower tire bead forcing it across the upright 27, down across the body 20 onto the lower surface 24 and subsequently into the drop center of the wheel. The bead drop mechanism is rotated around the wheel to progressively drop the bead of the tire over the rim into the drop center. As the bead is prevented from moving by the stop, and since it is held by the upright 2, the bead at that point is adjacent but does not touch the rim. The bead follows along surface 28, down over the surface 24 into the drop center of the wheel and the bead is thus placed over the rim without touching the rim during the mounting operation. The movement of the bead-drop is continued around the rim until it is closely adjacent the other side of the stop at which point the bead of the tire will be completely in the drop center of the wheel. The bead drop is then removed, again placed on the other side of the stop and the upper bead of the tire is then placed in a similar position on the stop 1 and on the body 20 against the diagonal surface 28. The handle 31 is again rotated in a clockwise direction, dropping the upper bead of the tire into the drop center of the wheel. When the bead drop mechanism is on the other side of the stop, the upper bead of the tire will be in position in the drop center of the wheel and the tire is mounted. In both cases of mounting the bead over the rim of the wheel, the bead is moved across smooth surfaces of the tire mounting mechanism without touching the rim during the mounting operation, thereby reducing substantially the possibility of damage to the bead.

Figure 6:
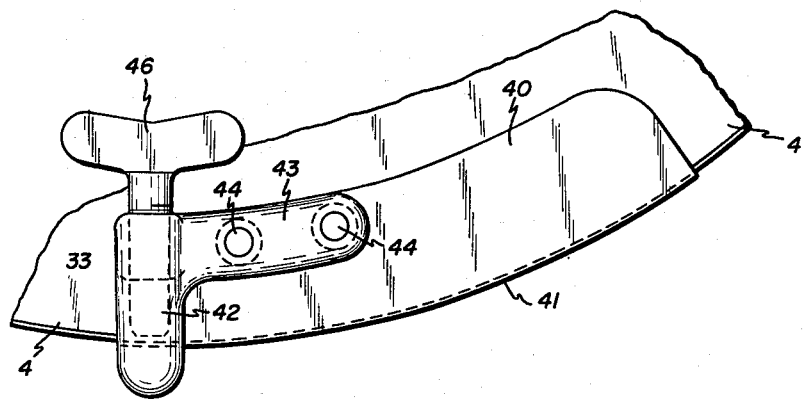
Fig. 6 is a top plan view of a modified bead holding mechanism.
Figure 7:
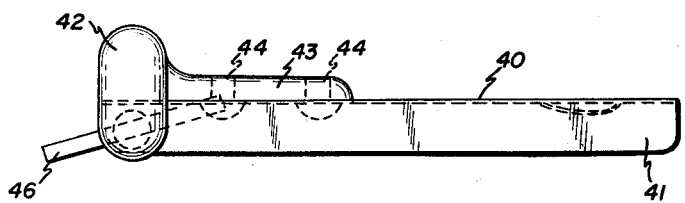
Fig. 7 is a side elevation of the modified bead-holding mechanism.
Figure 8:
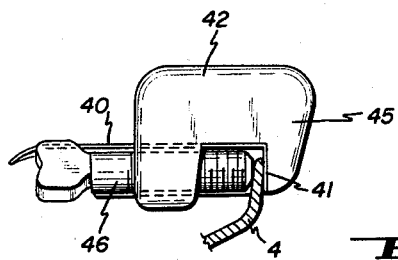
Fig. 8 is an end elevation of the modified bead-holding mechanism illustrated in mounted position on a rim of a wheel.

The modified bead holder, illustrated in Figs. 6 through 8, includes a substantially horizontal body 40 which is arranged to seat on the rim 4 of the wheel 33. The body 40 includes an arcuate surface 41 extending laterally or axially from the body and is arranged to hook over a wheel rim. An upright portion 42 having a circumferential extension 43 is secured to the body 40 by means of rivets 44. The upright member should be securely fastened to the body 40, and rivets, bolts and nuts, welding, and like means may be utilized to secure the two parts together. The upright 42 includes an upright surface 45 which slopes outwardly from the rim-holding surface 41 at about a fifteen-degree angle. This outwardly sloped surface prevents movement of the tire bead away from the rim. The stop is fastened to a rim 4 by means of a thumb screw 46 which securely fastens the device to the rim, as shown in Fig. 8.

With the modified bead stop, the thumb screw holds the stop upright on the wheel rim and the leveling cam is not required. When the modified stop is used, the tire bead rests along the surface 40, across surface 45 and into the drop center of the wheel. The bead drop tool is moved around the rim as described above until the point 22 thereof passes the end of the rim-hooking surface 41 so that the bead of the tire drops into the drop center of the wheel. With either stop, the bead is held across the rim without touching it, and the bead is prevented from popping out of the drop center as the bead dropping tool is rotated around the rim. The modified stop additionally aids in removal of the bead dropping tool, especially with heavy truck tires. When the bead dropping member is rotated around to the opposite side of the bead stop, the bead of some tires will not fall off into the drop center thereby making extraction from the rim difficult. By continuing the rotation of the bead dropping tool toward the stop, it rides up on surface 40, over the projection 43 onto stop member 42. This action not only pulls the bead dropping tool up, but, also, outwardly and disengages the tire bead which drops into the drop center. Thus, the bead dropping tool is automatically disengaged from the rim and bead.

The bead stop may be utilized in holding a bead stationary on a rim while placing the bead in the drop center of a wheel, utilizing most types of tire-mounting equipment; however, the unique ability to drop the bead over the rim of the wheel without touching the rim during the operation is not achieved without the use of the bead-drop tool of the invention. Likewise, the bead-drop tool may be used without the stop during the mounting operation, but the benefit of passing the bead over the rim without touching the same is not achieved without the combination of the two devices which shield the rim as the bead is dropped thereover.

While the invention has been illustrated by reference to specific devices, there is no intent to limit the scope or the spirit of the invention to the precise details so set forth, especially as the preferred form shown is a simplified form with the mounting tool made in two separate pieces, since it is obvious that the two may be joined into a single tool, and also, various means may be utilized to fasten the bead-stop mechanism to the rim of the wheel.

I claim:

1. As a new article of manufacture for holding a portion of the bead of a tire over and out of contact with the rim of a drop center wheel, comprising a body arranged to seat on the periphery of a rim and in a radial plane of a wheel, a portion extending laterally of said body for hooking over a rim and cover a portion thereof, an upstanding member extending laterally of said body from and opposite said hooking portion in position to hold the tire bead over and out of contact with a rim, means extending radially outwardly from and associated with said upstanding member for preventing movement of a held tire bead away from a rim, and means for removably locking said body on a rim.

2. An article of manufacture according to claim 1 in which the means for removably locking said body on a rim includes a pair of cam members pivotally mounted on said body and arranged to move into engagement with a wheel rim and hold the body in stationary position on a wheel rim.

3. An article of manufacture according to claim 1 in which the means for removably locking said body on a rim includes a thumb-screw mounted on said body arranged to contact a rim and wedge the same against said hooking portion.

References Cited in the file of this patent

UNITED STATES PATENTS

| | | |
|---|---|---|
| 643,528 | Palmer | Feb. 3, 1900 |
| 949,561 | Alley | Feb. 15, 1910 |
| 965,076 | Carle | July 19, 1910 |
| 1,025,987 | Long | May 14, 1912 |
| 1,223,689 | Getzendaner | Apr. 24, 1917 |
| 1,405,872 | Schmitt | Feb. 7, 1922 |
| 2,112,661 | Abrahams | Mar. 29, 1938 |
| 2,378,955 | Teegarden | June 26, 1945 |
| 2,534,515 | Henderson | Dec. 19, 1950 |
| 2,556,024 | Bourdon et al. | June 5, 1951 |
| 2,772,726 | Mercaldo | Dec. 4, 1956 |

FOREIGN PATENTS

| | | |
|---|---|---|
| 185,405 | Great Britain | Nov. 11, 1922 |
| 456,097 | France | June 10, 1913 |